May 19, 1942.  C. P. EDGREN ET AL  2,283,669
CLEANING TOOL AND DIPPER FOR OIL BURNERS
Filed May 9, 1940
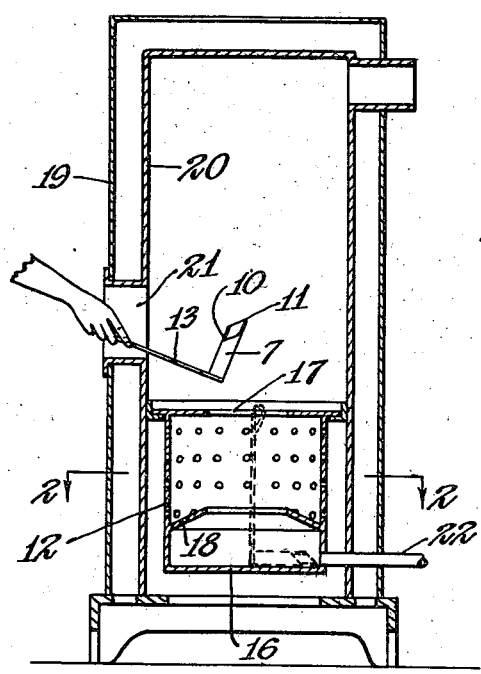
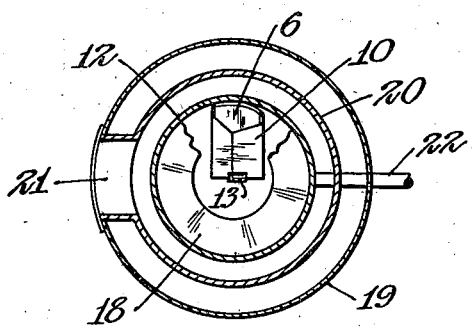
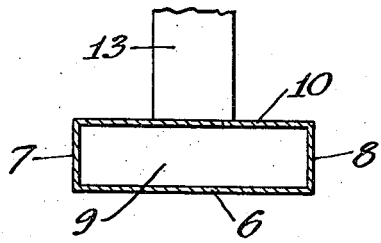
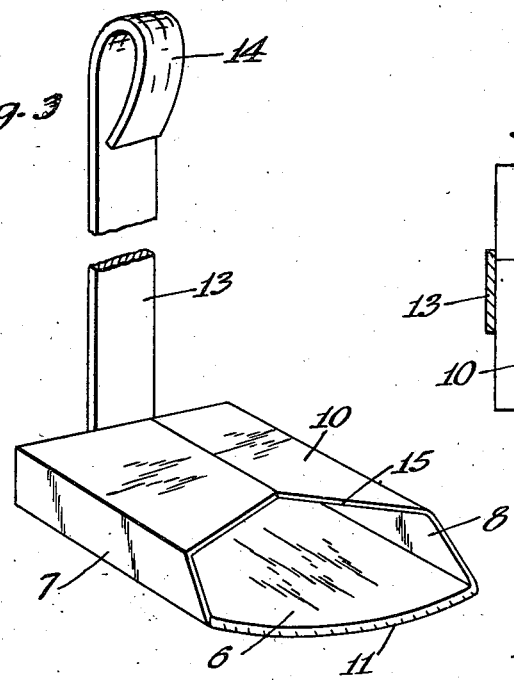
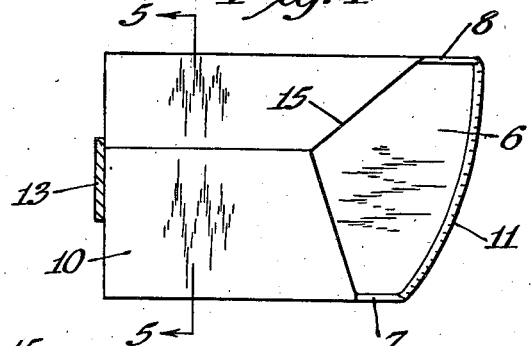
Inventors
Carl P. Edgren
John E. Olson
By
John E. Hyken Jr.
Attorney Patented May 19, 1942

2,283,669

UNITED STATES PATENT OFFICE 2,283,669

CLEANING TOOL AND DIPPER FOR OIL BURNERS

Carl P. Edgren and John E. Olson, St. Paul, Minn.

Application May 9, 1940, Serial No. 334,220

1 Claim. (Cl. 30—136)

It is an object of this invention to provide a novel and inexpensive tool particularly, although not exclusively, adapted for cleaning oil burners of the pot type wherein the surfaces which require cleaning periodically are difficult or impossible to reach with ordinary cleaning implements.

A further object is to combine in a tool of this class a dipper-like receptacle adapted for use in removing oil from the burner pot.

The invention will be best understood by reference to the accompanying drawing in which:

Figure 1 is a central vertical section through one type of stove and burner which may be cleaned by the use of our device, and illustrating the method of inserting our device into and removing it from the burner pot;

Fig. 2 is a horizontal section taken on the line 2—2 of Fig. 1 and showing our device in operative relation to the cylindrical wall of the burner;

Fig. 3 is a perspective view of the tool;

Fig. 4 is a plan view of our device, with part of the handle removed, and

Fig. 5 is a cross section taken on the line 5—5 of Fig. 4.

The head or receptacle part of the tool is preferably constructed from sheet metal formed with a flat bottom 6, integral with low, upstanding side walls 7 and 8, an end wall 9 and a top 10. The front end of this receptacle is open to receive soot or liquid oil, quantities of which may be carried out of the burner after tilting the tool, as indicated in full lines in Fig. 1. The bottom 6 has a beveled scraper edge 11 extending in an arc adapted to approximately conform to the curvature of the cylindrical wall 12 of the burner to be cleaned. A handle 13 of suitable length projects upward approximately at right angles to the bottom 6, the normally upper end 14 of the handle being bent to form a loop to be gripped by the user. The top 10 of the receptacle is cut back, as indicated along an edge 15, to allow soot that is scraped from the walls of the burner to fall onto the bottom 6 when in use.

The receptacle formed by the members 6, 7, 8, 9 and 10 is liquid tight so that excess oil may be dipped from the bottom of the burner as required in some cleaning operations. The side wall 8 is longer than the side wall 7 and the edge 11 extends obliquely from the front end of the wall 8 to the front end of the wall 7 so that soot may be gathered into the receptacle on the bottom 6 by rotation of the tool about the longitudinal axis of the handle 13 when in position on the bottom of the burner. The front ends of the walls 7 and 8 are inclined from the scraper edge 11 to the edge 15 of the top 10 to allow the scraper edge of the bottom 6 to be applied with the latter at various angles to the burner walls.

The burner illustrated in the drawing is of the pot type having a circular bottom 16, a cylindrical wall 12 (formed around its upper portion with a multiplicity of perforations to admit air) and a restricted top opening 17 from which the flame rises into a combustion chamber above. The burner also has a conical baffle or pilot ring 18 spaced above the bottom 16. The stove shown in the drawing has an outer casing 19 spaced from an inner casing or combustion chamber 20 and a door opening 21 to allow access to the burner. Oil is fed to the burner through a supply pipe 22.

When our improved cleaning tool is to be used it is inserted through the opening 21, as shown in Fig. 1 of the drawing, and is then lowered, with the handle 13 substantially upright, through the opening 17 to a position like that shown in dotted lines in Fig. 1, for example. From this position the tool may be rotated about the axis of the handle 13 and the edge 11 moved around and across the bottom 16 of the burner to gather soot and oil into the receptacle. The cylindrical wall 12 may be scraped and cleaned by vertical motion of the handle while applying the edge 11 to various segments of the wall successively. After gathering a quantity of soot or oil or both into the head or receptacle of the tool the latter is withdrawn, while tilted in the position indicated in full lines in Fig. 1, through the opening 21. The operation is repeated until the entire walls and bottom of the burner have been cleaned. Occasionally it is necesary to dip oil from the bottom of the burner and our improved tool may be used for this purpose in an obvious manner, the oil being scooped in over the edge 11 and carried out of the stove with the tool in the position indicated in full lines in Fig. 1.

It will now be evident that our device greatly facilitates the cleaning of peculiarly inaccessible surfaces of burners of the pot type illustrated and that it also meets the need for an implement for dipping oil from the burner when necessary or desirable, as for example, in preparing to remove the deposits of soot.

Having described our invention, what we claim as new and desire to protect by Letters Patent is:

A tool for cleaning pot burners comprising a receptacle having a bottom, elongated sides, a closed end and an open end, one of said sides projecting outwardly beyond the opposing side, a blade projecting from said open end substantially in the plane of said bottom and extending between the extremities of said sides obliquely across the open end of said receptacle in a continuous convex arc, and a handle secured to the closed end of said receptacle and extending upwardly therefrom.

CARL P. EDGREN.
JOHN E. OLSON.